(12) United States Patent
Moshiri et al.

(10) Patent No.: US 9,459,783 B2
(45) Date of Patent: Oct. 4, 2016

(54) ZOOMING AND PANNING WIDGET FOR INTERNET BROWSERS

(75) Inventors: Negar Moshiri, Bethesda, MD (US); Charles W. K. Gritton, Sterling, VA (US); Daniel S. Simpkins, Bethesda, MD (US); Tom Pixley, Springfield, VA (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 88 days.

(21) Appl. No.: 13/143,898

(22) PCT Filed: Jan. 6, 2010

(86) PCT No.: PCT/US2010/020204
§ 371 (c)(1),
(2), (4) Date: Aug. 23, 2011

(87) PCT Pub. No.: WO2010/080793
PCT Pub. Date: Jul. 15, 2010

(65) Prior Publication Data
US 2012/0030613 A1    Feb. 2, 2012

Related U.S. Application Data

(60) Provisional application No. 61/143,633, filed on Jan. 9, 2009.

(51) Int. Cl.
*G06F 3/048* (2013.01)
*G06F 3/0485* (2013.01)
*G06F 3/0346* (2013.01)

(52) U.S. Cl.
CPC ........... *G06F 3/0485* (2013.01); *G06F 3/0346* (2013.01); *G06F 2203/04806* (2013.01)

(58) Field of Classification Search
CPC ........................................................ G06F 3/048
See application file for complete search history.

(56) References Cited

U.S. PATENT DOCUMENTS 5,032,989 A *   7/1991   Tornetta ........................ 705/313
5,073,771 A *  12/1991   Satta ..................... G06F 3/0481
                                                                345/163

(Continued)

OTHER PUBLICATIONS

International Search Report for PCT/US2010/020204 mailed Sep. 7, 2010.

(Continued)

*Primary Examiner* — Jennifer To
*Assistant Examiner* — Xuyang Xia
(74) *Attorney, Agent, or Firm* — Patent Portfolio Builders PLLC

(57) ABSTRACT

In one aspect, a widget mechanism for zooming and panning a content item is provided. The widget mechanism includes a first region including a miniaturized and complete version the content item. The widget mechanism further includes a second region including a displayed version of the content item. The displayed version represents a portion of the content item currently displayed on a display. The widget mechanism further includes a third region including a to be displayed version of the content item. The to be displayed version represents a portion of the content item to be displayed on the display upon actuation. The second region is smaller than and within the first region when the content item is zoomed and the second region is coextensive or substantially coextensive with the first region when the content item is fully not zoomed. The third region is adjustable within the first region.

16 Claims, 10 Drawing Sheets

(56) References Cited

U.S. PATENT DOCUMENTS

| | | | |
|---|---|---|---|
| 6,563,547 B1* | 5/2003 | Smith | 348/565 |
| 7,139,983 B2 | 11/2006 | Kelts | |
| 7,158,118 B2 | 1/2007 | Liberty et al. | |
| 7,206,029 B2* | 4/2007 | Cohen-Solal | 348/565 |
| 7,236,156 B2 | 6/2007 | Liberty et al. | |
| 7,239,301 B2 | 7/2007 | Liberty et al. | |
| 7,535,456 B2 | 5/2009 | Liberty et al. | |
| 2002/0067379 A1* | 6/2002 | Kenyon et al. | 345/838 |
| 2002/0158887 A1 | 10/2002 | Samra et al. | |
| 2004/0268393 A1 | 12/2004 | Hunleth et al. | |
| 2005/0005241 A1* | 1/2005 | Hunleth et al. | 715/720 |
| 2005/0210405 A1* | 9/2005 | Ernst et al. | 715/792 |
| 2006/0048071 A1* | 3/2006 | Jarrett et al. | 715/784 |
| 2006/0123183 A1 | 6/2006 | Koivisto et al. | |
| 2006/0250358 A1 | 11/2006 | Wroblewski et al. | |
| 2007/0283276 A1* | 12/2007 | Neely et al. | 715/747 |
| 2008/0163116 A1 | 7/2008 | Lee et al. | |
| 2009/0249257 A1* | 10/2009 | Bove et al. | 715/858 |
| 2010/0010958 A1* | 1/2010 | Perrow et al. | 707/1 |

OTHER PUBLICATIONS

Written Opinion for PCT/US2010/020204 mailed Sep. 7, 2010.
International Preliminary Report on Patentability for PCT/US2010/020204 mailed Jul. 21, 2011.

* cited by examiner

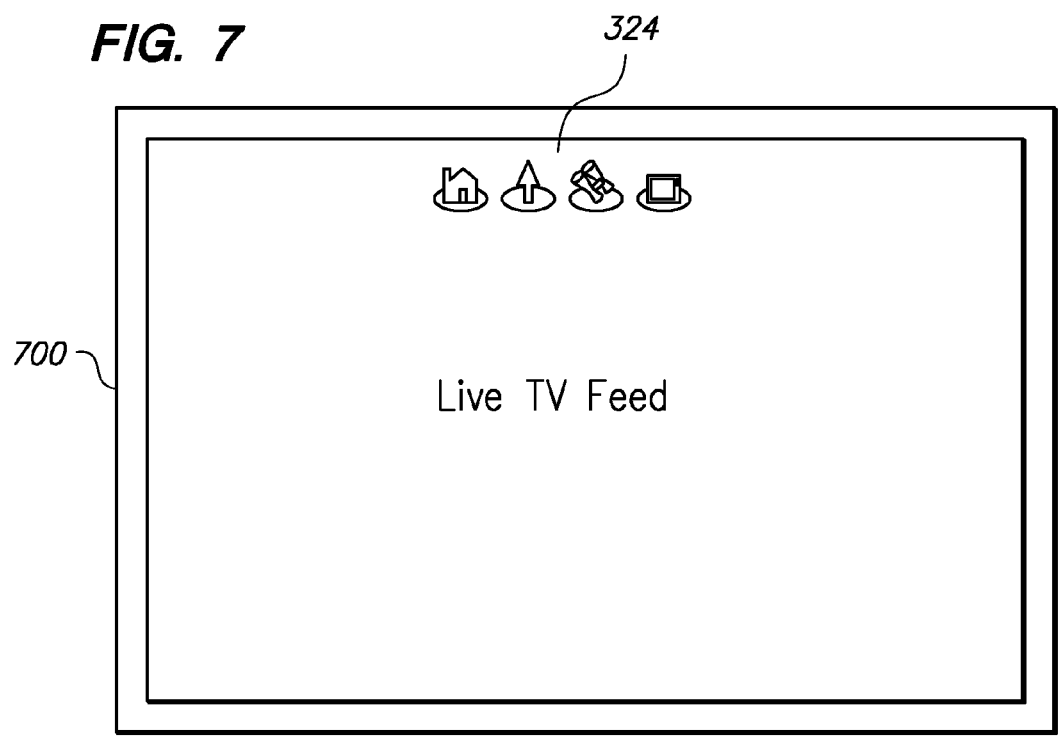
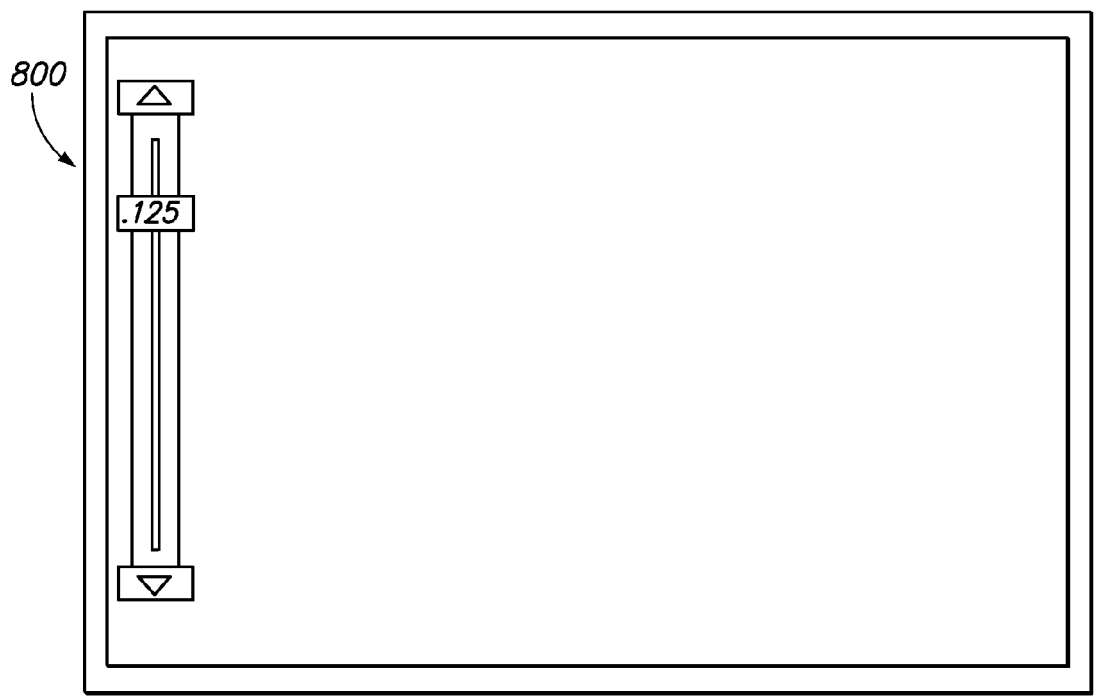

ZOOMING AND PANNING WIDGET FOR INTERNET BROWSERS

CROSS-REFERENCE TO RELATED APPLICATIONS

This application claims priority from U.S. Provisional Application Ser. No. 61/143,633, entitled "ZOOMING AND PANNING WIDGET FOR INTERNET BROWSERS," filed Jan. 9, 2009, which is herein incorporated by reference in its entirety.

BACKGROUND

This application describes, among other things, controls employed in user interfaces.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection process even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications, systems and methods for these remote devices for interacting with such frameworks. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices with scroll wheels. The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device may be performed wirelessly or via a wire connecting the 3D pointing device to another device. Thus "3D pointing" differs from, e.g., conventional computer mouse pointing techniques which use a surface, e.g., a desk surface or mousepad, as a proxy surface from which relative movement of the mouse is translated into cursor movement on the computer display screen. An example of a 3D pointing device can be found in U.S. patent application Ser. No. 11/119,663, the disclosure of which is incorporated here by reference.

SUMMARY

According to one exemplary embodiment, a widget mechanism for zooming and panning a content item, includes a first region including a miniaturized and complete version of the content item, a second region including a displayed version of the content item, the displayed version representing a portion of the content item currently displayed on a display; and a third region including a to be displayed version of the content item, the to be displayed version representing a portion of the content item to be displayed on the display upon actuation; wherein the second region is smaller than and within the first region when the content item is zoomed and the second region is coextensive or substantially coextensive with the first region when the content item is fully not zoomed, and wherein the third region is adjustable within the first region.

According to another exemplary embodiment, an Internet browser for displaying a content item includes a display displaying at least a portion of the content item, a widget mechanism, the widget mechanism overlaying the at least a portion of the content item and including a first region including a miniaturized and complete version of the content item, a second region including a displayed version of the content item, the displayed version representing the at least a portion of the content item currently displayed on the display, and a third region including a to be displayed version of the content item, the to be displayed version representing at least a portion of the content item to be displayed on the display upon actuation, wherein the third region is adjustable within the first region by making smaller the third region relative to the first region thereby zooming in the to be displayed version of the content item, by making the third region coextensive or substantially coextensive with the first region when fully zoomed out thereby zooming out the to be displayed version of the content item, and by panning the third region within the first region.

BRIEF DESCRIPTION OF THE DRAWINGS

The accompanying drawings illustrate exemplary embodiments of the present invention, wherein:

FIG. 7 shows a live TV UI view which can be reach via actuation of a live TV global navigation object according to an exemplary embodiment of the present invention;

FIGS. 8 and 9 depict channel changing and volume control overlays which can be rendered visible on the live TV UI view of FIG. 7 according to an exemplary embodiment of the present invention;

DETAILED DESCRIPTION

Figure 1:
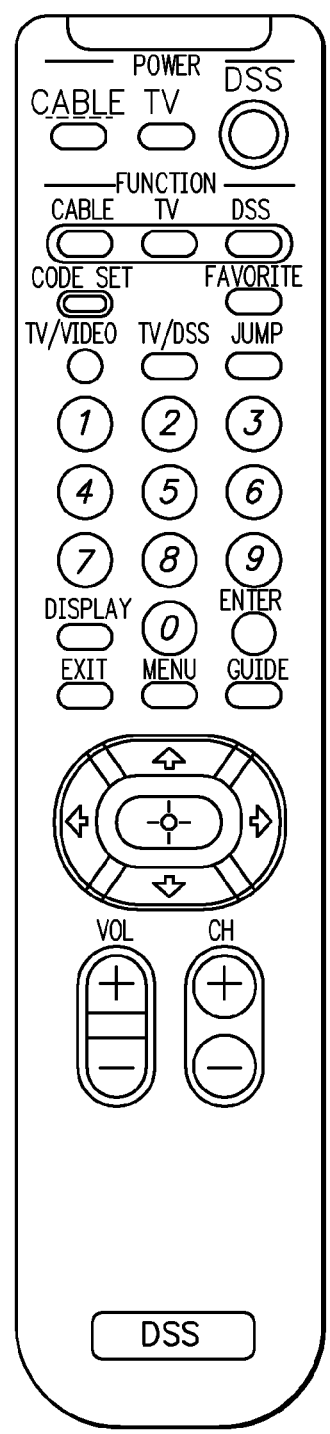
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
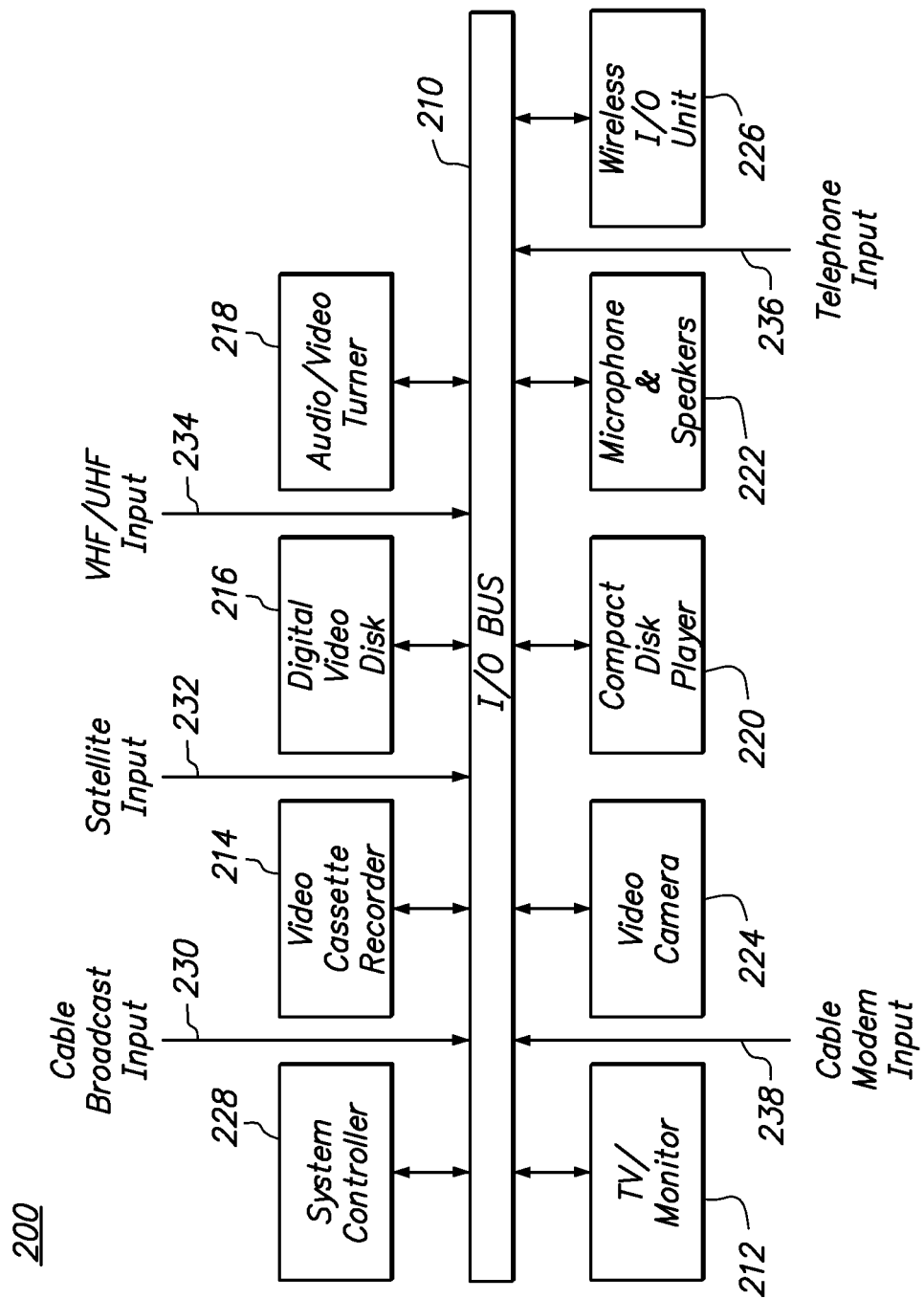
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. patent application "A Control Framework with a Zoomable Graphical User Interface for Organizing, Selecting and Launching Media Items". Alternatively, remote devices and interaction techniques between remote devices and user interfaces in accordance with the present invention can be used in conjunction with other types of systems, for example computer systems including, e.g., a display, a processor and a memory system or with various other systems and applications.

Figure 3A:
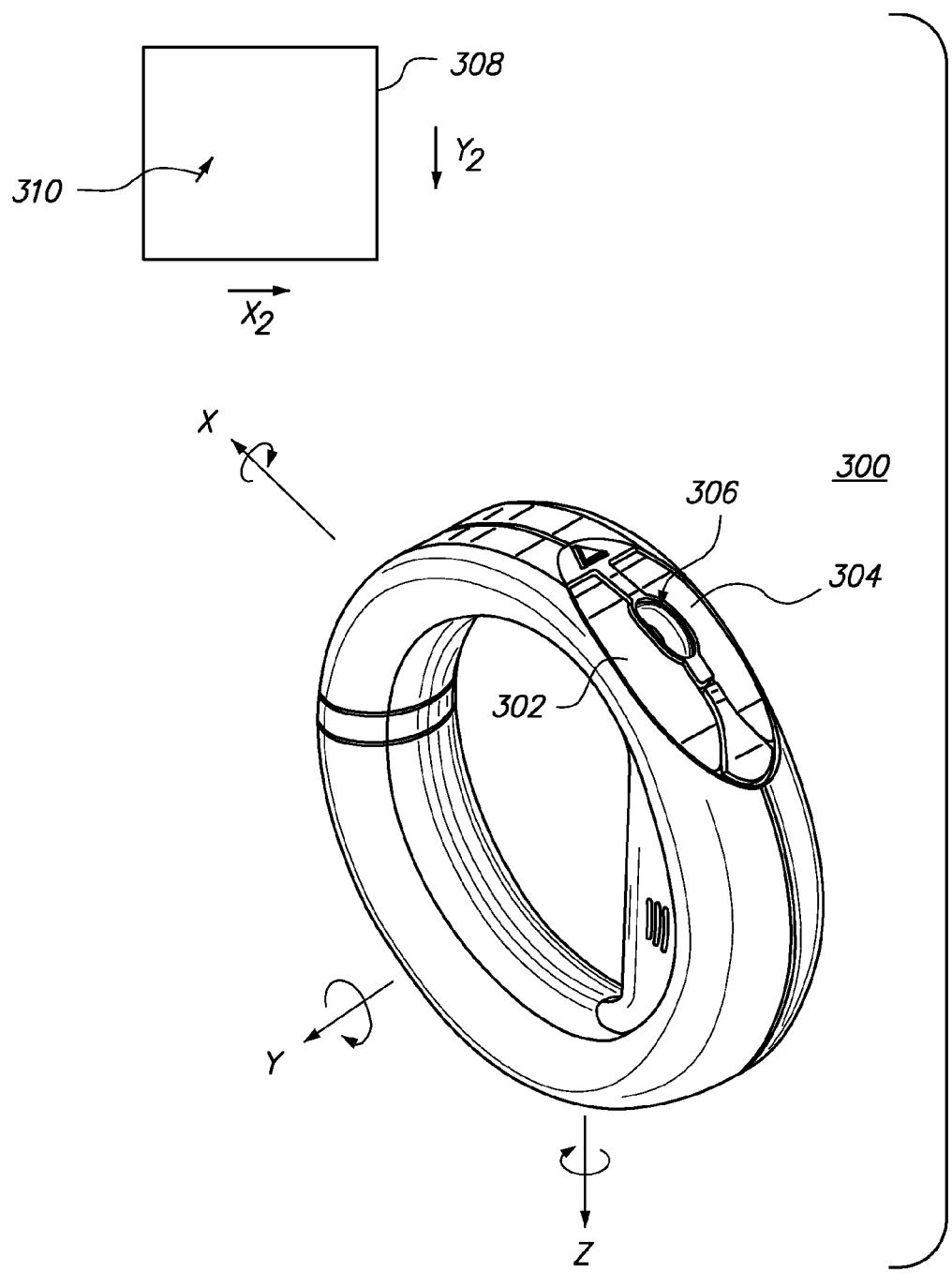
FIG. 3(a) shows a 3D pointing device according to an exemplary embodiment of the present invention.

As mentioned in the Background section, remote devices which operate as 3D pointers are of particular interest for the present specification, although the present invention is not limited to systems including 3D pointers. Such devices enable the translation of movement of the device, e.g., linear movement, rotational movement, acceleration or any combination thereof, into commands to a user interface. An exemplary loop-shaped, 3D pointing device 300 is depicted in FIG. 3(a), however the present invention is not limited to loop-shaped devices. In this exemplary embodiment, the 3D pointing device 300 includes two buttons 302 and 304 as well as a scroll wheel 306 (scroll wheel 306 can also act as a button by depressing the scroll wheel 306), although other exemplary embodiments will include other physical configurations. User movement of the 3D pointing device 300 can be defined, for example, in terms of rotation about one or more of an x-axis attitude (roll), a y-axis elevation (pitch) or a z-axis heading (yaw). In addition, some exemplary embodiments of the present invention can additionally (or alternatively) measure linear movement of the 3D pointing device 300 along the x, y, and/or z axes to generate cursor movement or other user interface commands. An example is provided below. A number of permutations and variations relating to 3D pointing devices can be implemented in systems according to exemplary embodiments of the present invention. The interested reader is referred to U.S. patent application Ser. No. 11/119,663, entitled (as amended) "3D Pointing Devices and Methods", filed on May 2, 2005, U.S. patent application Ser. No. 11/119,719, entitled (as amended) "3D Pointing Devices with Tilt Compensation and Improved Usability", also filed on May 2, 2005, U.S. patent application Ser. No. 11/119,987, entitled (as amended) "Methods and Devices for Removing Unintentional Movement in 3D Pointing Devices", also filed on May 2, 2005, and U.S. patent application Ser. No. 11/119,688, entitled "Methods and Devices for Identifying Users Based on Tremor", also filed on May 2, 2005, the disclosures of which are incorporated here by reference, for more details regarding exemplary 3D pointing devices which can be used in conjunction with exemplary embodiments of the present invention.

According to exemplary embodiments of the present invention, it is anticipated that 3D pointing devices 300 will be held by a user in front of a display 308 and that motion of the 3D pointing device 300 will be translated by the 3D pointing device into output which is usable to interact with the information displayed on display 308, e.g., to move the cursor 310 on the display 308. For example, such 3D pointing devices and their associated user interfaces can be used to make media selections on a television as shown in FIG. 3(*b*), which will be described in more detail below. Aspects of exemplary embodiments of the present invention can be optimized to enhance the user's experience of the so-called "10-foot" interface, i.e., a typical distance between a user and his or her television in a living room. For example, interactions between pointing, scrolling, zooming and panning, e.g., using a 3D pointing device and associated user interface, can be optimized for this environment as will be described below, although the present invention is not limited thereto.

Referring again to FIG. 3(*a*), an exemplary relationship between movement of the 3D pointing device 300 and corresponding cursor movement on a user interface will now be described. Rotation of the 3D pointing device 300 about the y-axis can be sensed by the 3D pointing device 300 and translated into an output usable by the system to move cursor 310 along the $y_2$ axis of the display 308. Likewise, rotation of the 3D pointing device 308 about the z-axis can be sensed by the 3D pointing device 300 and translated into an output usable by the system to move cursor 310 along the $x_2$ axis of the display 308. It will be appreciated that the output of 3D pointing device 300 can be used to interact with the display 308 in a number of ways other than (or in addition to) cursor movement, for example it can control cursor fading, volume or media transport (play, pause, fast-forward and rewind). Additionally, the system can be programmed to recognize gestures, e.g., predetermined movement patterns, to convey commands in addition to cursor movement. Moreover, other input commands, e.g., a zoom-in or zoom-out on a particular region of a display (e.g., actuated by pressing button 302 to zoom-in or button 304 to zoom-out), may also be available to the user.

Returning now to the application illustrated in FIG. 3(*b*), the GUI screen (also referred to herein as a "UI view", which terms refer to a currently displayed set of UI objects) seen on television 320 is a home view. In this particular exemplary embodiment, the home view displays a plurality of applications 322, e.g., "Photos", "Music", "Recorded", "Guide", "Live TV", "On Demand", and "Settings", which are selectable by the user by way of interaction with the user interface via the 3D pointing device 300. Such user interactions can include, for example, pointing, scrolling, clicking or various combinations thereof. For more details regarding exemplary pointing, scrolling and clicking interactions which can be used in conjunction with exemplary embodiments of the present invention, the interested reader is directed to U.S. patent application Ser. No. 11/417,764, entitled "METHODS AND SYSTEMS FOR SCROLLING AND POINTING IN USER INTERFACE", to Frank J. Wroblewski, filed on May 4, 2006, the disclosure of which is incorporated here by reference.

Of particular interest for exemplary embodiments of the present invention are the global navigation objects 324 displayed above the UI objects 322 that are associated with various media applications. Global navigation objects 324 provide short cuts to significant applications, frequently used UI views or the like, without cluttering up the interface and in a manner which is consistent with other aspects of the particular user interface in which they are implemented. Initially some functional examples will be described below, followed by some more general characteristics of global navigation objects according to exemplary embodiments of the present invention.

Although the global navigation objects 324 are displayed in FIG. 3(*b*) simply as small circles, in actual implementations they will typically convey information regarding their functionality to a user by including an icon, image, text or some combination thereof as part of their individual object displays on the user interface. A purely illustrative example is shown in FIG. 4. Therein, four global navigation objects 400-406 are illustrated. The leftmost global navigation object 400 operates to provide the user with a shortcut to quickly reach a home UI view (main menu). For example, the user can move the 3D pointing device 300 in a manner which will position a cursor (not shown) over the global navigation object 400. Then, by selecting the global navigation object 400, the user interface will immediately display the home view, e.g., the view shown in FIG. 3(*b*). Other mechanisms can be used to select and actuate the global navigation object 400, as well as the other global navigation objects generally referenced by 324. For example, as described in the above-identified patent application entitled "METHODS AND SYSTEMS FOR SCROLLING AND POINTING IN USER INTERFACE", to Frank J. Wroblewski, each of the global navigation objects 324 can also be reached by scrolling according to one exemplary embodiment of the present invention.

The other global navigation objects 402 through 406 similarly provide shortcut access to various UI views and/or functionality. For example, global navigation object 402 is an "up" global navigation object. Actuation of this global navigation object will result in the user interface displaying a next "highest" user interface view relative to the currently displayed user interface view. The relationship between a currently displayed user interface view and its next "highest" user interface view will depend upon the particular user interface implementation. According to exemplary embodiments of the present invention, user interfaces may use, at least in part, zooming techniques for moving between user interface views. In the context of such user interfaces, the next "highest" user interface view that will be reached by actuating global navigation object 402 is the UI view which is one zoom level higher than the currently displayed UI view. Thus, actuation of the global navigation object 402 will result in a transition from a currently displayed UI view to a zoomed out UI view which can be displayed along with a zooming transition effect. The zooming transition effect can be performed by progressive scaling and displaying of at least some of the UI objects displayed on the current UI view to provide a visual impression of movement of those UI objects away from an observer. In another functional aspect of the present invention, user interfaces may zoom-in in response to user interaction with the user interface which will, likewise, result in the progressive scaling and display of UI objects that provide the visual impression of movement toward an observer. More information relating to zoomable user interfaces can be found in U.S. patent application Ser. No. 10/768,432, filed on Jan. 30, 2004, entitled "A Control Framework with a Zoomable Graphical User Interface for Organizing, Selecting and Launching Media Items", and U.S. patent application Ser. No. 09/829,263, filed on Apr. 9, 2001, entitled "Interactive Content Guide for Television Programming", the disclosures of which are incorporated here by reference.

Movement within the user interface between different user interface views is not limited to zooming. Other non-zooming techniques can be used to transition between user interface views. For example, panning can be performed by progressive translation and display of at least some of the user interface objects which are currently displayed in a user interface view. This provides the visual impression of lateral movement of those user interface objects to an observer.

Figure 5:
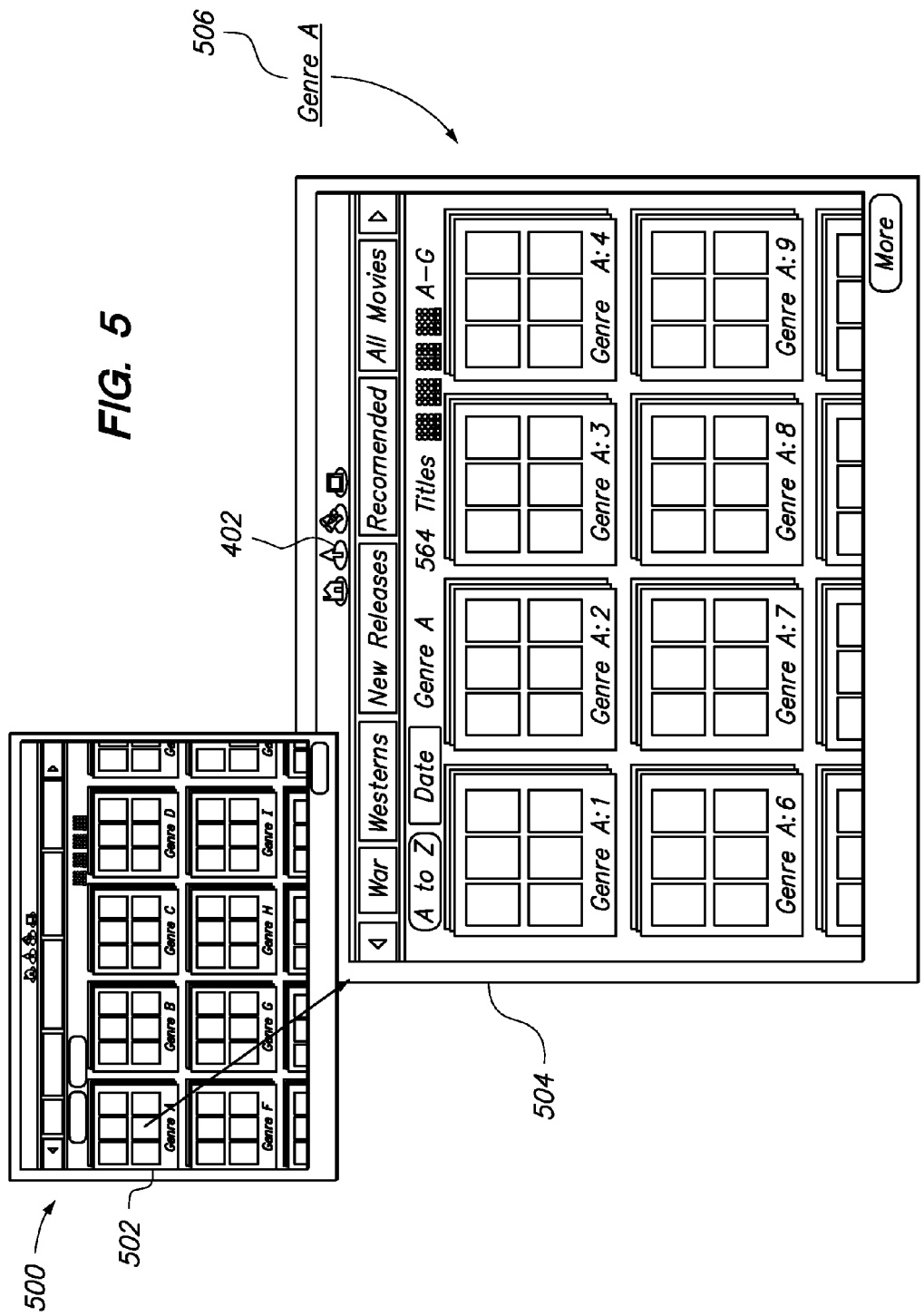
FIG. 5 depicts a zooming transition as well as a usage of an up function global navigation object according to an exemplary embodiment of the present invention.

Regardless of the different techniques which are employed in a particular user interface implementation to transition between user interface views, the provision of a global navigation object 402 which provides an up function may be particularly beneficial for user interfaces in which there are multiple paths available for a user to reach the same UI view. For example, consider the UI view 500 shown in FIG. 5. This view illustrates a number of on-demand movie selections, categorized by genre, which view 500 can be reached by, for example, zooming in on the "On Demand" application object shown in the home view of FIG. 3(b). By pressing the zoom-in button 302 on the 3D pointing device 300 one more time, while the current focus (e.g., selection highlighting) is on the UI object associated with "Genre A" 502 in the UI view 500, the user interface will zoom-in on this object to display a new UI view 504. The UI view 504 will display a number of sub-genre media selection objects which can, for example, be implemented as DVD movie cover images. However, this same UI view 504 could also have been reached by following a different path through the user interface, e.g., by actuating a hyperlink 506 from another UI view. Under this scenario, actuating the up global navigation object 402 from UI view 504 will always result in the user interface displaying UI view 502, regardless of which path the user employed to navigate to UI view 504 in the first place. By way of contrast, if the user actuates the zoom-out (or back) button 304 from UI view 504, the user interface will display the previous UI view along the path taken by the user to reach UI view 504. Thus, according to this exemplary embodiment of the present invention, the up global navigation object 504 provides a consistent mechanism for the user to move to a next "highest" level of the interface, while the zoom-out (or back) button 304 on the 3D pointing device 300 provides a consistent mechanism for the user to retrace his or her path through the interface.

Figure 6:
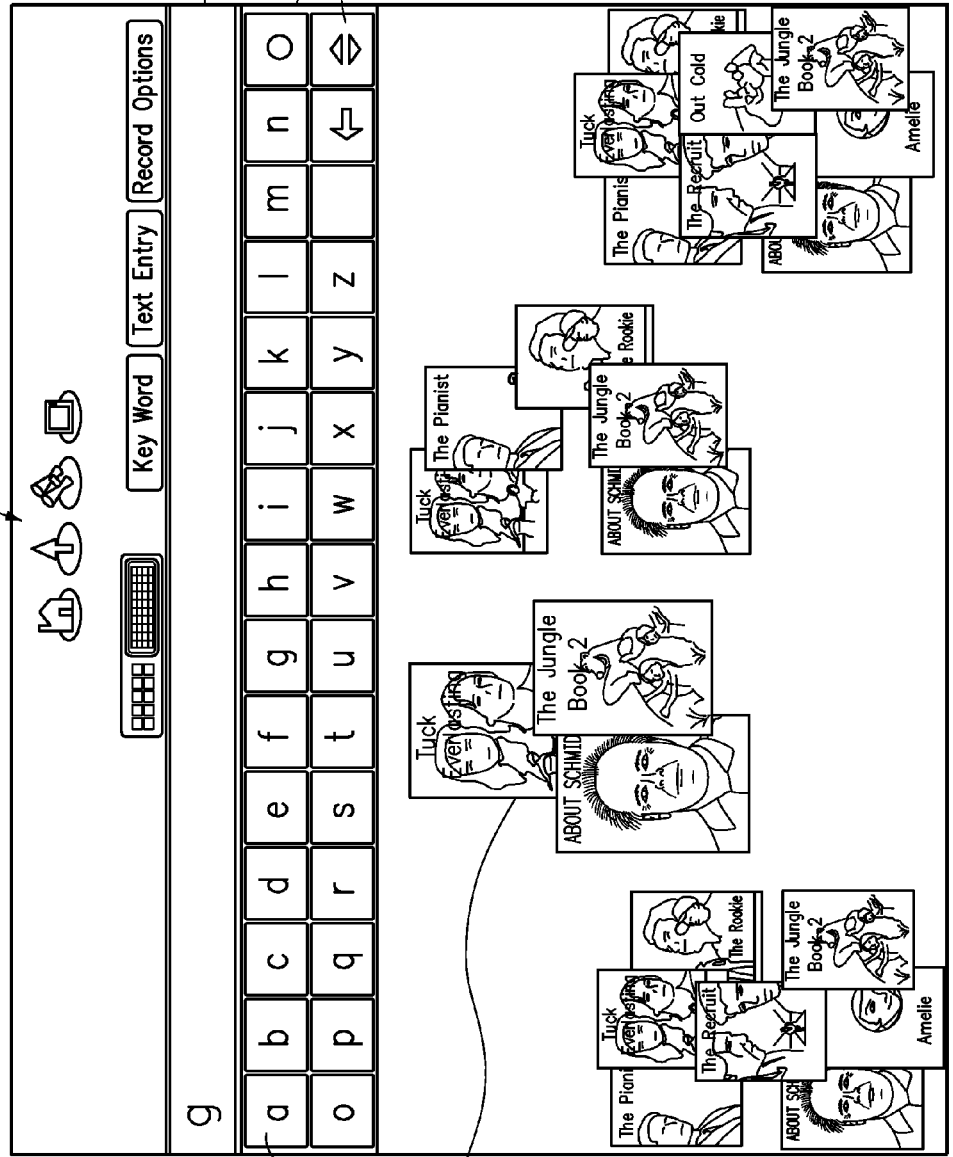
FIG. 6 shows a search tool which can be displayed as a result of actuation of a search global navigation object according to an exemplary embodiment of the present invention.

Returning to FIG. 4, global navigation object 404 provides a search function when activated by a user. As a purely illustrative example, the search tool depicted in FIG. 6 can be displayed when a user actuates the global navigation object 404 from any of the UI views within the user interface on which global navigation object 404 is displayed. The exemplary UI view 600 depicted in FIG. 6 contains a text entry widget including a plurality of control elements 604, with at least some of the control elements 604 being drawn as keys or buttons having alphanumeric characters 614 thereon, and other control elements 604 being drawn on the interface as having non-alphanumeric characters 616 which can be, e.g., used to control character entry. In this example, the control elements 604 are laid out in two horizontal rows across the interface, although other configurations may be used.

Upon actuating a control element 604, e.g., by clicking a button on a the 3D pointing device 300 when a particular element 604 has the focus, the corresponding alphanumeric input is displayed in the textbox 602, disposed above the text entry widget, and one or more groups of displayed items related to the alphanumeric input provided via the control element(s) can be displayed on the interface, e.g., below the text entry widget. Thus, the GUI screen depicted in FIG. 6 according to one exemplary embodiment of the present invention can be used to search for selectable media items, and graphically display the results of the search on a GUI screen, in a manner that is useful, efficient and pleasing to the user. (Note that in the illustrated example of FIG. 6, although the letter "g" is illustrated as being displayed in the text box 602, the displayed movie cover images below the text entry widget simply represent a test pattern of DVD movie covers and are not necessarily related to the input letter "g" as they could be in an implementation, e.g., the displayed movie covers could be only those whose movie titles start with the letter "g"). This type of search tool enables a user to employ both keyword searching and visual browsing in a powerful combination that expedites a search across, potentially, thousands of selectable media items. By selecting one of the DVD movie covers, e.g., UI object 608, the user interface can, for example, display a more detailed UI view associated with that movie, along with an option for a user to purchase and view that on-demand movie. As those skilled in the art will appreciate, given a potentially very large number of selectable media items, quick and easy access to a search tool made possible by the provision of global navigation object 404 on most, if not all, of the UI views provided by the user interface, provides the user with convenient access thereto.

Returning again to FIG. 4, the fourth global navigation object 406 displayed in this exemplary embodiment is a live TV global navigation object. Actuation of the global navigation object 406 results in the user interface immediately displaying a live TV UI view that enables a user to quickly view television programming from virtually any UI view within the interface. An example of a live TV UI view 700 is shown in FIG. 7, wherein it can be seen that the entire interface area has been cleared out of UI objects so that the user has an unimpeded view of the live television programming. A channel selection control overlay 800 (FIG. 8) can be displayed, and used to change channels, in response to movement of the cursor proximate to the leftmost region of the user interface. Similarly a volume control overlay 900 (FIG. 9) can be displayed, and used to change the output volume of the television, in response to movement of the cursor proximate to the rightmost region of the user interface. More information relating to the operation of the channel selection control overlay 800 and volume control overlay 900 can be found in the above-incorporated by reference U.S. patent application entitled "METHODS AND SYSTEMS FOR SCROLLING AND POINTING IN USER INTERFACE", to Frank J. Wroblewski.

Figure 9:
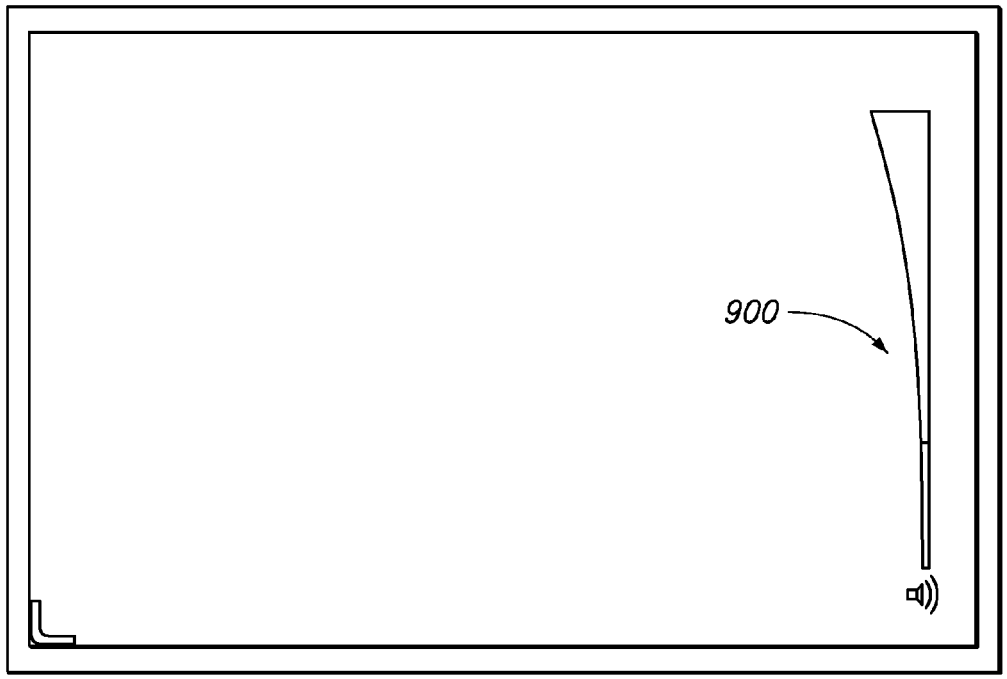

Comparing FIGS. 7, 8 and 9 reveals that the global navigation objects 324 are visible in the UI view 700, but not in the UI views 800 and 900. This visual comparison introduces the different display states of global navigation objects according to exemplary embodiments of the present invention. More specifically, according to one exemplary embodiment of the present invention, the global navigation objects 324 can be displayed in one of three display states: a watermark state, an over state and a non-displayed state. In their watermark (partially visible) state, which is a default display state, each of the global navigation 324 are displayed in a manner so as to be substantially transparent (or faintly filled in) relative to the rest of the UI objects in a given UI view. For example, the global navigation objects can be displayed only as a faint outline of their corresponding icons when in their watermark state. As the default display state, this enables the global navigation objects 324 to be sufficiently visible for the user to be aware of their location and functionality, but without taking the focus away from the substantially opaque UI objects which represent selectable media items.

In their over display state, which is triggered by the presence of a cursor proximate and/or over one of the global navigation objects 324, that global navigation object has its outline filled in to become opaque. Once in its over display state, the corresponding global navigation object 400-406 can be actuated, e.g., by a button click of the 3D pointing device 300.

Lastly, for at least some UI views, the global navigation objects 324 can also have a non-displayed state, wherein the global navigation objects 324 become completely invisible. This non-displayed state can be used, for example, in UI views such as the live TV view 700 where it is desirable for the UI objects which operate as controls to overlay the live TV feed only when the user wants to use those controls. This can be implemented by, for example, having the global navigation objects 324 move from their watermark display state to their non-displayed state after a predetermined amount of time has elapsed without input to the user interface from the user while a predetermined UI view is currently being displayed. Thus, if the live TV view 700 is currently being displayed on the television and the user interface does not receive any input, e.g., motion of the 3D pointing device 300, for more than 3 or 5 seconds, then the global navigation objects 324 can be removed from the display.

Global navigation objects 324 may have other attributes according to exemplary embodiments of the present invention, including the number of global navigation objects, their location as a group on the display, their location as individual objects within the group and their effects. Regarding the former attribute, the total number of global navigation objects should be minimized to provide needed short-cut functionality, but without obscuring the primary objectives of the user interface, e.g., access to media items, or overly complicating the interface so that the user can learn the interface and form navigation habits which facilitate quick and easy navigation among the media items. Thus according to various exemplary embodiments of the present invention, the number of global navigation objects 324 provided on any one UI view may be 1, 2, 3, 4, 5, 6 or 7 but preferably not more than 7 global navigation objects will be provided to any given user interface. The previously discussed and illustrated exemplary embodiments illustrate the global navigation objects 324 being generally centered along a horizontal axis of the user interface and proximate a top portion thereof, however other exemplary embodiments of the present invention may render the global navigation objects in other locations, e.g., the upper righthand or lefthand corners of the user interface. Whichever portion of the user interface is designated for display of the global navigation buttons, that portion of the user interface should be reserved for such use, i.e., such that the other UI objects are not selectable within the portion of the user interface which is reserved for the global navigation objects 324.

Additionally, location of individual global navigation objects 324 within the group of global navigation objects, regardless of where the group as a whole is positioned on the display, can be specified based on, e.g., frequency of usage. For example, it may be easier for users to accurately point to global navigation objects 324 at the beginning or end of a row that those global navigation objects in the middle of the row. Thus the global navigation objects 324 which are anticipated to be most frequently used, e.g., the home and live TV global navigation objects in the above-described examples, can be placed at the beginning and end of the row of global navigation objects 324 in the exemplary embodiment of FIG. 4.

According to some exemplary embodiments of the present invention, global navigation objects can have other characteristics regarding their placement throughout the user interface. According to one exemplary embodiment, the entire set of global navigation objects are displayed, at least initially, on each and every UI view which is available in a user interface (albeit the global navigation objects may acquire their non-displayed state on at least some of those UI views as described above). This provides a consistency to the user interface which facilitates navigation through large collections of UI objects. On the other hand, according to other exemplary embodiments, there may be some UI views on which global navigation objects are not displayed at all, such that the user interface as a whole will only have global navigation objects displayed on substantially every UI view in the user interface.

Figure 10:
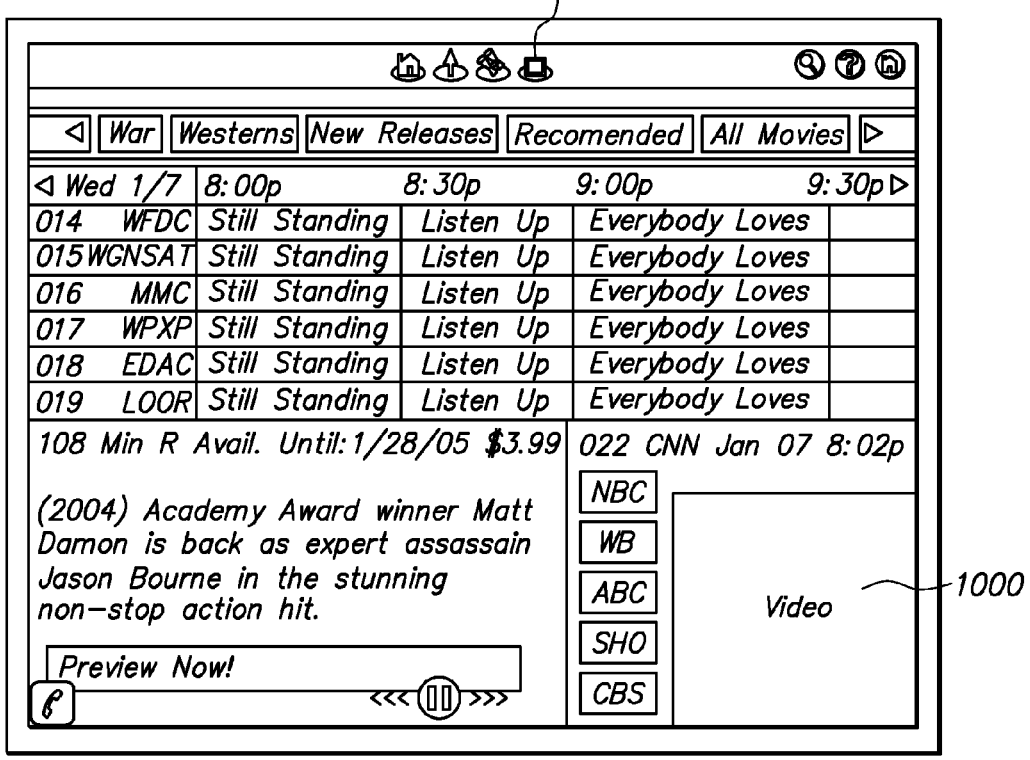
FIG. 10 shows an electronic program guide view having global navigation objects according to an exemplary embodiment of the present invention.

Likewise, it is generally preferable that, for each UI view in which the global navigation objects are displayed, they be displayed in an identical manner, e.g., the same group of global navigation objects, the same images/text/icons used to represent each global navigation function, the same group location, the same order within the group, etc. However there may be some circumstances wherein, for example, the functional nature of the user interface suggests a slight variance to this rule, e.g., wherein one or more global navigation objects are permitted to vary based on a context of the UI view in which it is displayed. For example, for a UI view where direct access to live TV is already available, the live TV global navigation object 406 can be replaced or removed completely. In the above-described exemplary embodiment this can occur when, for example, a user zooms-in on the application entitled "Guide" in FIG. 3(*b*). This action results in the user interface displaying an electronic program guide, such as that shown in FIG. 10, on the television (or other display device). Note that from the UI view of FIG. 10, a user can directly reach a live TV UI view in a number of different ways, e.g., by positioning a cursor over the scaled down, live video display 1000 and zooming in or by positioning a cursor over a program listing within the grid guide itself and zooming in. Since the user already has direct access to live TV from the UI view of FIG. 10, the live TV global navigation object 406 can be replaced by a DVR global navigation object 1002 which enables a user to have direct access to a DVR UI view. Similarly, the live TV global navigation object 406 for the live TV UI views (e.g., that of FIG. 7) can be replaced by a guide global navigation object which provides the user with a short-cut to the electronic program guide. For those exemplary embodiments of the present invention wherein one or more global navigation objects are permitted to vary from UI view to UI view based on context, it is envisioned that there still will be a subset of the global navigation objects which will be the same for each UI view on which global navigation objects are displayed. In the foregoing examples, a subset of three of the global navigation objects (e.g., those associated with home, up and search functions) are displayed identically (or substantially identically) and provide an identical function on each of the UI views on which they are displayed, while one of the global navigation objects (i.e., the live TV global navigation object) is permitted to change for some UI views.

Still another feature of global navigation objects according to some exemplary embodiments of the present invention is the manner in which they are handled during transition from one UI view to another UI view. For example, as mentioned above some user interfaces according to exemplary embodiments of the present invention employ zooming and/or panning animations to convey a sense of position change within a "Zuiverse" of UI objects as a user navigates between UI views. However, according to some exemplary embodiments of the present invention, the global navigation objects are exempt from these transition effects. That is, the global navigation objects do not zoom, pan or translate and are, instead, fixed in their originally displayed position while the remaining UI objects shift from, e.g., a zoomed-out view to a zoomed-in view. This enables user interfaces to, on the one hand, provide the global navigation objects as visual anchors, while, on the other hand, not detract from conveying the desired sense of movement within the user interface by virtue of having the global navigation buttons in their default watermark (transparent) state.

Zooming and Panning Widgets for Internet Browsers

Figure 3B:
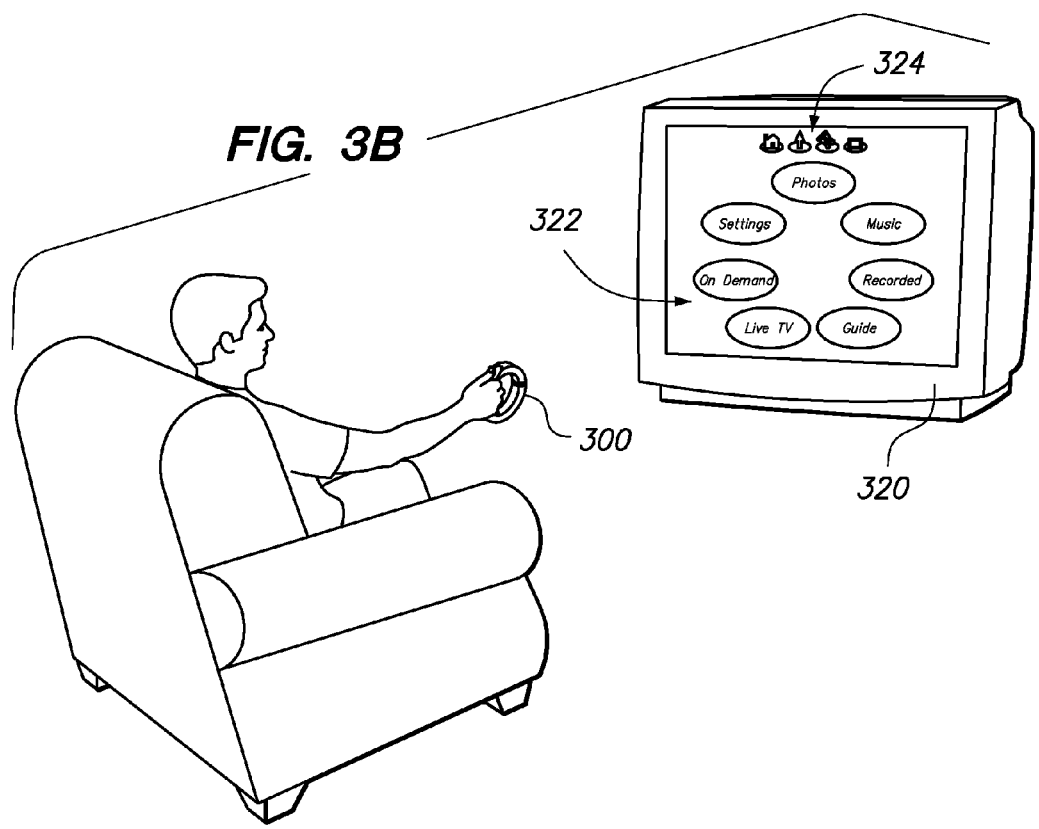
FIG. 3(b) illustrates a user employing a 3D pointing device to provide input to a user interface on a television according to an exemplary embodiment of the present invention.
Figure 4:
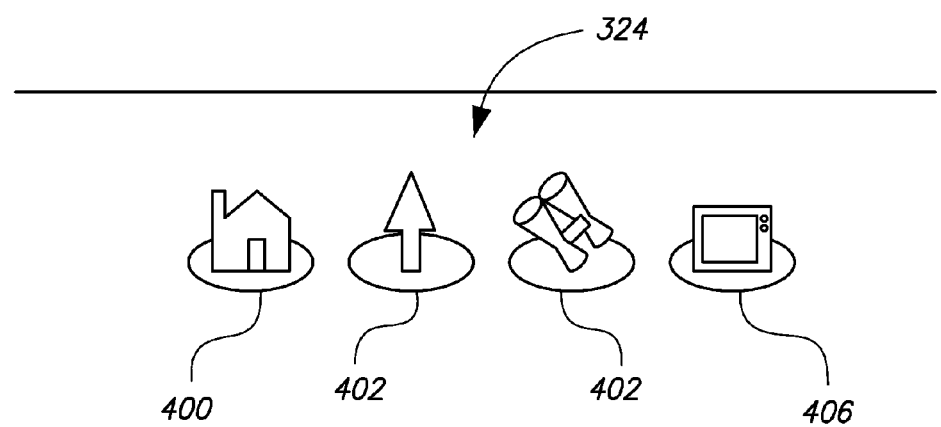
FIG. 4 shows the global navigation objects of FIG. 3(b) in more detail according to an exemplary embodiment of the present invention.
Figure 11A:
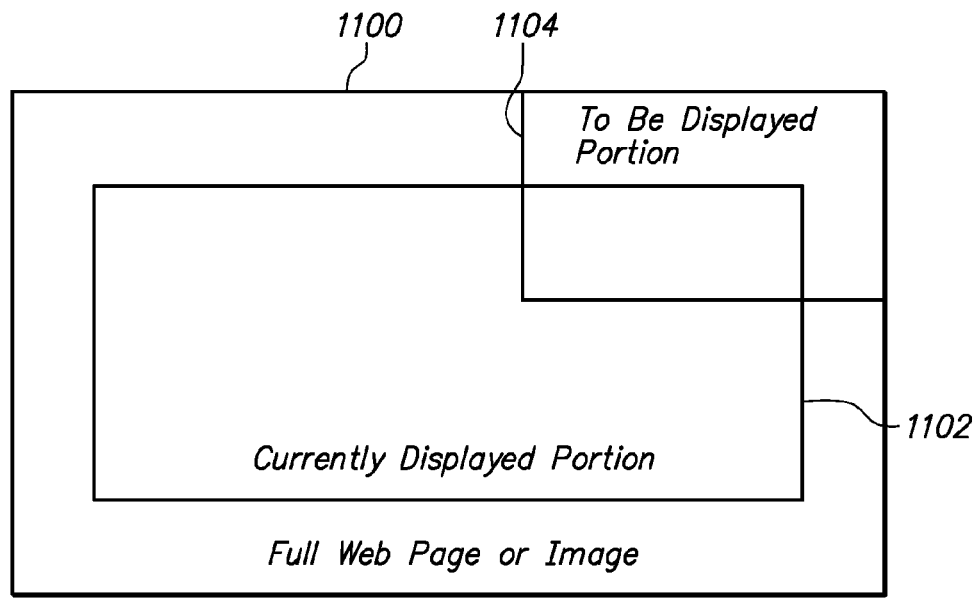
FIGS. 11(a)-11(c) show zooming and panning widgets according to exemplary embodiments of the present invention.
Figure 11B:
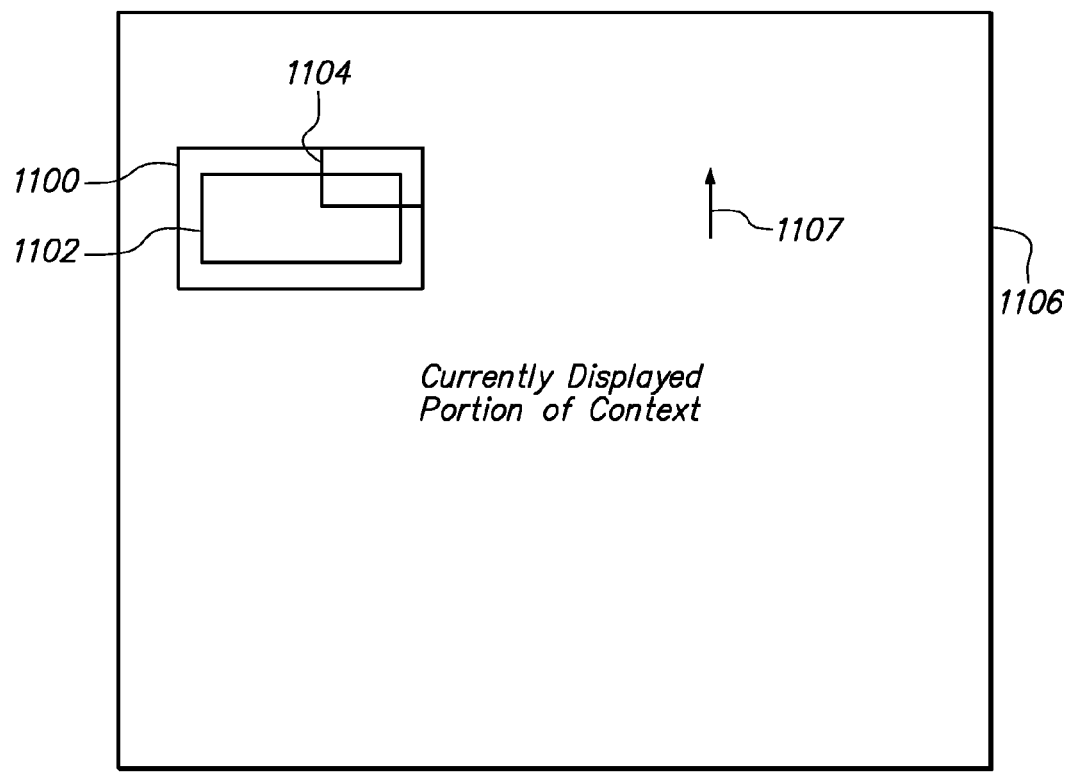
Figure 11C:
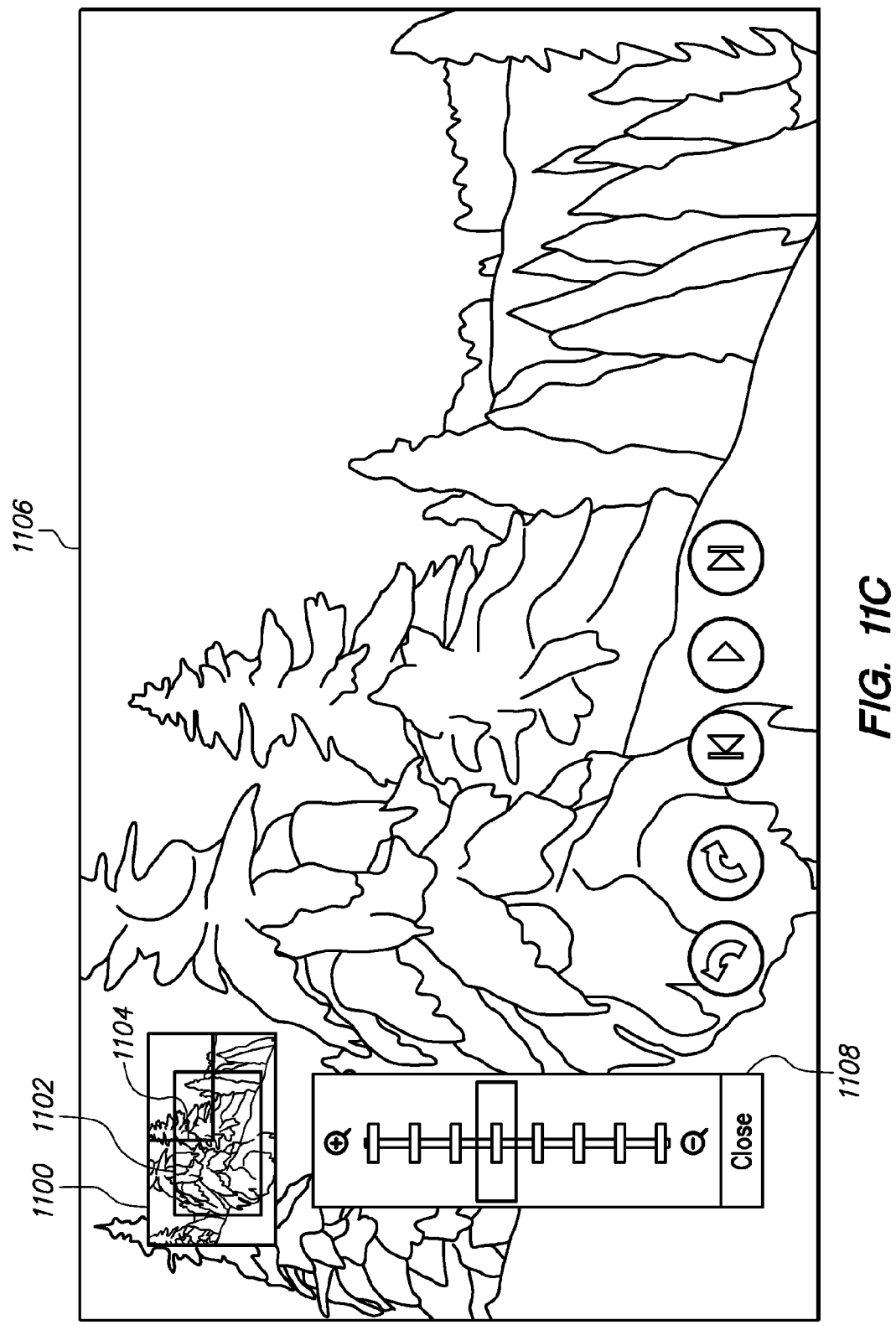

Although not shown in FIG. 3(b), applications 322 may also include an Internet browser to permit a user of the system to surf the Web on his or her television. Additionally, a zooming and panning widget as shown in FIGS. 11(a)-11(c) can be provided as an overlay to the displayed web page(s) to enable easy generic browsing on the TV. FIG. 11(a) illustrates the zooming and panning widget itself. The widget can include, for example, three rectangular regions. However, the number and shape of the regions may vary. The first region, defined by border 1100, contains a complete version, albeit miniaturized, of the content, e.g., a web page or image, which can be displayed on the television based on the current target being browsed. That is, the first region may include a miniaturized and complete version of a content item. The complete version of the content may fill the border 1100 completely or not, e.g., depending upon the aspect ratio of the content. The second region, defined by border 1102, displays the portion of the content which is currently displayed on the television. That is, the second region may include a displayed version of the content item. If the user has opted to zoom into the content, then the rectangle 1102 will be smaller than rectangle 1100. If no zooming is currently selected, then the rectangle 1102 will be coextensive with, or be displayed just inside of, rectangle 1100. The portion of the content displayed within rectangle 1102 may be displayed more brightly than the remainder of the content which is outside of rectangle 1102 but within rectangle 1100 to indicate to the user that rectangle 1102 indicates the portion of the content which is currently being viewed. The portion of the content displayed within the rectangle 1102 may otherwise be displayed in contrast to the remainder of the content which is outside of rectangle 1102 but within rectangle 1100.

The third region, defined by border 1104, is indicative of the portion of the content which will be displayed if the user actuates a user control to display the content associated with rectangle 1104, e.g., by panning to that portion of the entire web page or image shown in rectangle 1100. That is, the third region may include a to be displayed version of the content item. This rectangle 1104 is movable within rectangle 1100 like a cursor based on movement of an input device, such as the 3D pointing device described above. Each of the borders associated with the three rectangles 1100, 1102 and 1104 may be displayed with different colors to further distinguish their respective functions.

FIG. 11(b) displays the zooming and panning widget of FIG. 11(a) as an overlay on the currently displayed content on a television screen 1106 (or other display device). The widget may otherwise be displayed relevant to the currently displayed content. The position of the widget 1100-1104 on the television screen 1106 can be the same for all content displays, can be dragged to any desired position on the screen and/or can be set by the user. The widget 1100-1104 provides the user with an easy way to navigate within a web page or other content after zooming-in to better see some portion of the content, since he or she might not otherwise remember precisely what lays outside of the zoomed in region. The widget supplies this information via rectangles 1100 and 1102, and a mechanism to navigate outside of the currently displayed portion of the web page via rectangle 1104. Other browsing control elements can be added as well, as shown in the Appendix to U.S. Provisional Application Ser. No. 61/143,633 which is incorporated by reference above. A cursor 1107 can be displayed on the screen, having a position controllable via, e.g., the 3D pointing device. When the position of the cursor enters the rectangle 1100 of the widget, the cursor 1107 can be replaced by the rectangle 1104 (e.g., a border) whose position will then vary based upon movement of the pointing device. When the user actuates a control, e.g., a button or other element, while the cursor is within the rectangle 1100, the content displayed on screen 1106 will pan toward the portion of the content identified by rectangle 1104 at the time that the user actuates the control. The widget will then update the position of the rectangle 1102 within rectangle 1100 to reflect the now displayed portion of the web page. When the cursor moves out of the rectangle 1100, it changes back into whatever icon, e.g., an arrow, which is typically used to represent cursor functionality within the content, e.g., to select hyperlinks, buttons and the like on a web page.

FIG. 11(c) is a screenshot showing the widget 1100-1104 with actual content. Additionally, FIG. 11(c) depicts a zooming control overlay 1108 which controls the zoom level of the content currently being browsed. This particular control is purely exemplary and other zooming controls are shown in the Appendix to U.S. Provisional Application Ser. No. 61/143,633. Additionally, instead of using a zooming overlay control 1108, the scroll wheel on the input device can be used to control the zoom level which is used. A change in the zoom level via either type of control results in a zooming in or zooming out of the content, e.g., a web page, corresponding to the new zoom level. Zooming and panning can be actuated at the same time, or separately. For example, the user can select a new zoom level, e.g., by moving the slide bar of the zoom control 1108 displayed on the screen 1106 or by rotating the scroll wheel. This can have the effect of increasing or decreasing the size of rectangle 1104. The user can then move the rectangle 1104 to the desired location within rectangle 1100. Actuation, e.g., by way of a control or button on the pointing device, may then cause the selected zooming change and panning change to occur simultaneously on screen 1106 by animating both the zoom and the pan contemporaneously. Alternatively, the zooming and panning functions can be performed independently of one another using the widget 1100-1104 for panning and any of the afore-described controls for zooming.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. An Internet browser system for displaying a content item, comprising:
    a display device comprising a display screen displaying at least a portion of the same content item;
    a widget mechanism, said widget mechanism overlaying the at least a portion of the same content item and comprising:
    a first region including a miniaturized and complete version of the same content item;
    a second region including a displayed version of the same content item, said displayed version representing the at least a portion of the same content item currently displayed on the display device; and
    a third region including a to be displayed version of the same content item, said to be displayed version representing at least a portion of the same content item to be displayed on the display device upon actuation:
    adjust said third region within said first region by making smaller the third region relative to the first region thereby zooming in the to be displayed version of the same content item, or by making the third region coextensive with the first region when fully zoomed out thereby zooming out the to be displayed version of the same content item, and by panning the third region within the first region at the same time;
    animate the selected zooming change and panning change simultaneously on the display screen by actuating a button on a remote pointing device;
    wherein said third region overlaps a portion of both the first region and the second region, and
    wherein when a cursor displayed on the display device moves into said first region of said widget mechanism, said cursor is replaced by said third region and said third region is movable within said first region based on movement of the remote pointing device.

2. The Internet browser system of claim 1, wherein the widget mechanism is a movable overlay to the at least a portion of the same content item currently displayed on the display device.

3. The Internet browser system of claim 1, wherein the first, second, and third regions are rectangular in shape.

4. The Internet browser system of claim 1, wherein the first, second, and third regions are defined by borders.

5. The Internet browser system of claim 4, wherein the first, second, and third regions are defined by different colored borders.

6. The Internet browser system of claim 1, wherein the miniaturized and complete version of the same content item completely occupies the first region.

7. The Internet browser system of claim 1, wherein contents of the second region are displayed in contrast to a remainder of contents of the first region outside the second region.

8. The Internet browser system of claim 7, wherein contents of the second region are displayed more brightly than a remainder of contents of the first region outside the second region.

9. The Internet browser system of claim 1, wherein said third region is adjustable by making smaller or coextensive or substantially coextensive and by panning simultaneously.

10. The Internet browser system of claim 1, wherein said third region becomes said second region upon actuation.

11. The Internet browser system of claim 10, wherein said third region becomes said second region upon actuation from a pointing device.

12. The Internet browser system of claim 1, wherein said third region is defined by a border, said border being adjustable within said first region using input from a pointing device.

13. The Internet browser system of claim 12, wherein said border is adjustable by making smaller or coextensive or substantially coextensive using scroll wheel input from a pointing device.

14. The Internet browser system of claim 1, wherein a position of said cursor is controllable via an input from a pointing device, and wherein said cursor is an icon when said position does not overlay said widget mechanism and said cursor is a border defining said third region when said cursor overlays said widget mechanism.

15. The Internet browser system of claim 14, wherein said icon comprises an arrow.

16. The Internet browser system of claim 1, further comprising a zooming control, said zooming control overlaying the at least a portion of the same content item and controlling a zoom level of the to be displayed version of the same content item.

* * * * *